United States Patent [19]

Cheung

[11] 4,438,752
[45] Mar. 27, 1984

[54] VEHICLE IGNITION SYSTEM

[76] Inventor: William S. H. Cheung, 95B Robinson Rd., Ground Floor, Hong Kong, Hong Kong

[21] Appl. No.: 299,490

[22] Filed: Sep. 4, 1981

[30] Foreign Application Priority Data

Jul. 24, 1981 [GB] United Kingdom ............... 8122957

[51] Int. Cl.³ ............................................. B60R 25/00
[52] U.S. Cl. .............................. 123/630; 123/146.5 B; 123/198 B; 123/198 D; 180/287; 307/10 AT; 340/64
[58] Field of Search ............. 123/630, 198 B, 146.5 B, 123/198 D; 180/287; 307/10 AT; 340/63, 64

[56] References Cited

U.S. PATENT DOCUMENTS

| | | | |
|---|---|---|---|
| 3,675,036 | 7/1972 | Davies | 123/198 B |
| 3,828,750 | 8/1974 | Schuette et al. | 123/630 |
| 4,141,332 | 2/1979 | Wyler | 123/198 B |
| 4,186,710 | 2/1980 | Kilgore | 123/146.5 B |
| 4,207,850 | 6/1980 | Wharton | 123/146 B |

FOREIGN PATENT DOCUMENTS

| | | | |
|---|---|---|---|
| 54-47912 | 12/1979 | Japan | 123/198 B |
| 671742 | 5/1952 | United Kingdom. | |
| 1258120 | 12/1971 | United Kingdom. | |

Primary Examiner—Parshotam S. Lall
Attorney, Agent, or Firm—Pollock, Vande Sande & Priddy

[57] ABSTRACT

A vehicle ignition system comprises a transformer having a primary winding and a secondary winding for providing the desired high voltage to the spark plug of the vehicle engine and a circuit including a further winding for said transformer connected across a switch and a load. The switch is operable only by a security device and when it is closed, the load absorbs energy from the transformer so that insufficient voltage is generated at the spark plug and the vehicle is immobilized. The load can be replaced by a reverse flux generator, the reverse flux opposing that generated by the primary winding. The security device may comprise a conventional key and keyhole, or more sophisticated devices such as code readers which read a code inputted from a magnetic card or from a keyboard. Further security may be provided by a further switch in series with the primary winding and battery, the further switch being operable in synchronism with and in the opposite sense to the first mentioned switch.

8 Claims, 2 Drawing Figures

VEHICLE IGNITION SYSTEM

BACKGROUND OF THE INVENTION

Conventional vehicle ignition systems include a switch operated by a key to connect the vehicle battery to the ignition coil. This arrangement is not very secure, and thieves have been able to energize the vehicle engine by short-circuiting the switch operated by the key.

Additional vehicle security systems have been proposed, independent of the ignition system, for example causing an alarm to sound if the vehicle is tampered with, but if the alarm is itself disabled, it is still possible to dive away the vehicle by short-circuiting the ignition switch.

SUMMARY OF THE INVENTION

The present invention has the object of providing an additional security device within the ignition system which disables the system for illicit use independent of the possible short-circuiting of the ignition switch.

According to this invention there is provided a vehicle ignition system comprising a transformer having a primary winding and a secondary winding for providing the desired high voltage to the engine and a circuit including a further winding of said transformer which circuit when activated prevents sufficient magnetic flux in the system from reaching said secondary winding to provide the desired high voltage to the engine, the circuit being activated by a switch is normally closed and which is openable only by a security device. The security device may comprise a conventional key, but more sophisticated security devices include a coded magnetic card and card-reader, or a comparator which compares a code fed into the device with a preset code.

A further switch may be provided in the system in series with the primary winding of the transformer, the further switch being normally open, but closed in synchronism with the opening of the first switch under the control of the security device.

DESCRIPTION OF THE PREFERRED EMBODIMENT

Figure 1:
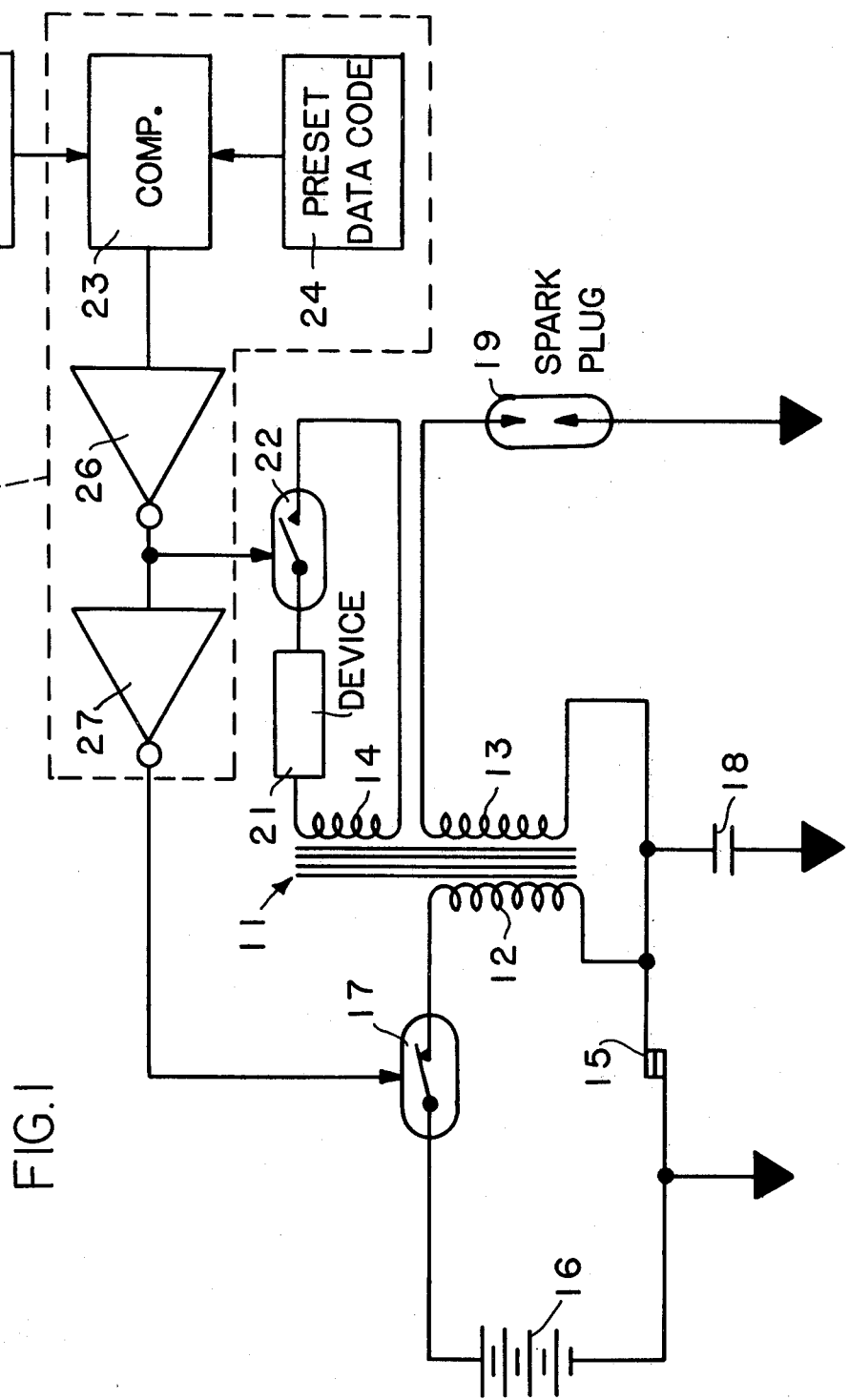
FIG. 1 is a schematic drawing of a first embodiment of the invention for providing a secure ignition system.

Examples of the invention will now be described with reference to the drawing FIG. 1 which is a circuit diagram of an ignition system for a vehicle.

In the figure, the ignition coil generally indicated at 11 has a primary winding 12, a conventional secondary winding 13 and an additional auxiliary winding 14. One terminal of the primary winding 12 is connected through a pair of contacts 15 of the distributor to the earthed terminal of the battery 16. The other terminal of the primary winding 12 is connected through a switch 17 to be described to the other terminal of the battery 16. A conventional ignition switch is not shown in the drawing, but if provided, would be located in series with the switch 17.

The first terminal of the primary winding and one terminal of the conventional secondary winding 13 of the coil 11 are connected together through a capacitor 18 to earth. The other terminal of the winding 13 provides the high voltage required for the vehicle engine, and in the drawing is shown being connected to a spark plug 19 in the engine.

The additional auxiliary winding 14 is connected across a device 21 and switch 22. The switches 17 and 22 are operable in response to electrical signals, and can comprise a triac, SCR, or any suitable semiconductor switch. The electrical signal to actuate the switches is provided by a comparator 23, which is fed with a signal from a preset data coding device 24 and compares this with the output of a code reader 25 into which the intending user of the vehicle inserts a code. If the inserted code is correct, the comparator 23 produces an electrical signal which is fed through an inverter 26 to cause the switch 22 to open and through a further inverter 27 to cause the switch 17 to close. When the comparator 23 produces the electrical signal, the battery 16 energizes the primary winding of the coil, and the additional auxiliary winding 14 produces no effect on the coil 11 since the switch 22 is open. The power from the winding 12 is therefore transferred to the secondary winding 13 and the spark plug 19. However, when the correct code is not fed into the reader 25, the comparator 23 does not produce an electrical signal and the switch 22 remains closed and the switch 17 remains open.

The device 21 can be a load, whose connection across the coil 14 by the switch 22 absorbs at least a substantial amount of the power from the winding 12 so that there is insufficient energy, if any, to energize the spark plug 19 through the coil 13.

Alternatively the device 21 can be a reverse flux generator, which passes a current through the coil to generate a flux in the transformer core which is approximately equal and opposite to that generated by the primary winding 12. The resultant flux at the winding 13 is therefore little or nothing, so that the spark plug 19 is not energized.

The opening of the switch 17 disconnects the battery 16 from the primary winding 12. Even if an illicit user manages to short-circuit the switch 17 in the same way as the conventional thief short-circuits the conventional ignition switch, the device 21 connected across the secondary winding 14 will prevent sufficient energy reaching the spark plug 19. The additional winding 14, the device 21 and the switch 22 can be encapsulated within the coil so that it is not possible or at least very difficult for the illicit user to cancel the effect of the winding 14.

The provision of the switch 17 makes the conventional ignition switch unnecessary. A key may be used to input the code into the code reader 25, but if desired a magnetic card may be used or even a keyboard may be provided for the user to feed the code into the code reader.

Figure 2:
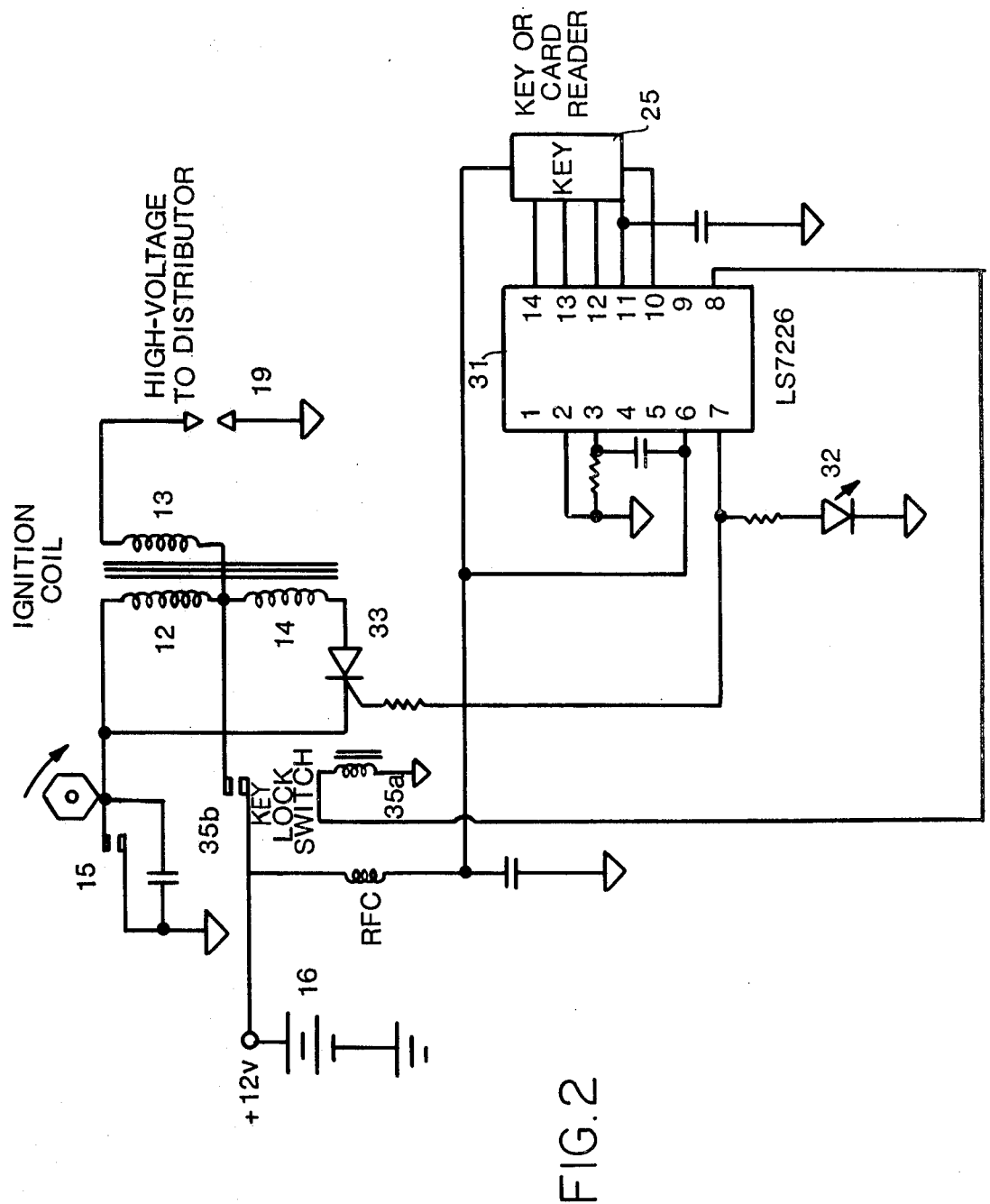
FIG. 2 is a schematic drawing of an embodiment of the invention using conventional components.

Referring now to FIG. 2, another embodiment of the invention is shown. In this embodiment, the circuitry 29 for actuating switches 22 and 17 is replaced by a single integrated circuit 31, manufactured by LS1 Computer System Inc., known to those skilled in the art as part no. LS7225. Connected to the input ports 10–14 is a code generator which may be the same as code reader 25 of FIG. 1. Any device such as a magnetic card or thumbwheel binary digit generator may serve as code generator 25. Integrated circuit 31 will provide first and second enabling voltages on ports 7 and 8 when the proper code is applied to ports 10–14. Indicator 32, which may be a light emitting diode indicates the condition of the ignition system as either locked or unlocked.

Silicon controlled rectifier 33 takes the place of switch 17 of FIG. 1. When the gate of SCR 33 is enabled, equal and opposite currents flow through windings 12 and 14. The flux produced from primary winding 12 is cancelled by the flux produced by auxiliary winding 14. Thus, secondary winding 13 receives only a residual flux insufficient to produce a spark producing voltage. Also relay winding 35a is deenergized in the locked condition opening contacts 35b.

When the proper code has been reviewed by integrated circuit 31, no enabling voltage occurs at port 7 and therefore SCR 33 is rendered non-conducting. Also, port 8 applies a voltage for energizing relay winding 35a. Contacts 35b therefore assumes a closed condition permitting primary winding 12 to generate a flux for inducing a spark generating voltage in secondary winding 13.

Although the conventional firing system for an internal combustion engine has been shown with mechanical contacts 15, the invention can clearly be applied to other ignition systems, including electronic systems.

What is claimed is:

1. A vehicle ignition system comprising:
   a transformer having a primary winding, secondary winding and auxiliary winding;
   means for alternately connecting said primary winding to a voltage source whereby a magnetic flux is generated, said magnetic flux inducing an ignition current in said secondary winding;
   a security switch means serially connecting a power dissipating load to said auxiliary winding, said load reducing said secondary winding current prohibiting an ignition current of sufficient magnitude for providing ignition to said vehicle;
   a comparator for opening said security switch means in response to a unique input code; and
   means for supplying a unique code to said comparator whereby said vehicle ignition current is restored upon detection of said unique code.

2. A system as claimed in claim 1 wherein said means for supplying comprises a magnetic card reader, the switch means being openable only when a magnetic card with a predetermined code is inserted into the card reader.

3. A system as claimed in claim 1, wherein the coil has a primary winding and the system comprises a further switch in series with said primary winding, the further switch being normally open, but connected for closing in synchronism with the opening of said normally closed switch.

4. A system as claimed in claim 1, wherein the means for supplying comprises a keyboard.

5. A vehicle ignition circuit comprising:
   a transformer having a primary winding serially connected at a first junction with an auxiliary winding, and, secondary winding;
   a switching means connecting said auxiliary winding free end with said primary winding free end forming a second junction;
   means for applying a voltage potential between the first junction of said primary and auxiliary winding and the junction of said switch means and said primary winding whereby a current flows through said primary winding;
   magnetic card reading means connected to enable and disable said switching means, whereby said switching means when enabled, provides for a current through said auxiliary winding, cancelling a flux generated by said primary windings, and when said switching means is disabled, inhibiting current flow through said auxiliary winding whereby said secondary winding produces an ignition current in response to said primary winding current.

6. The ignition system of claim 5 further including a second switching means operable from a keylock and connected to interrupt a current flow in said primary and auxiliary winding when said magnetic card reading means is enabling said first switching means, whereby operation of said vehicle requires both closing said second switching means and opening said first switching means.

7. The vehicle ignition system of claim 5, wherein said means connected to said auxiliary winding includes a current path for dissipating a current induced in said auxiliary winding.

8. The vehicle ignition system of claim 5, further comprising means for indicating when a current is supplied to said auxiliary winding.

* * * * *